United States Patent Office 3,052,130
Patented Sept. 4, 1962

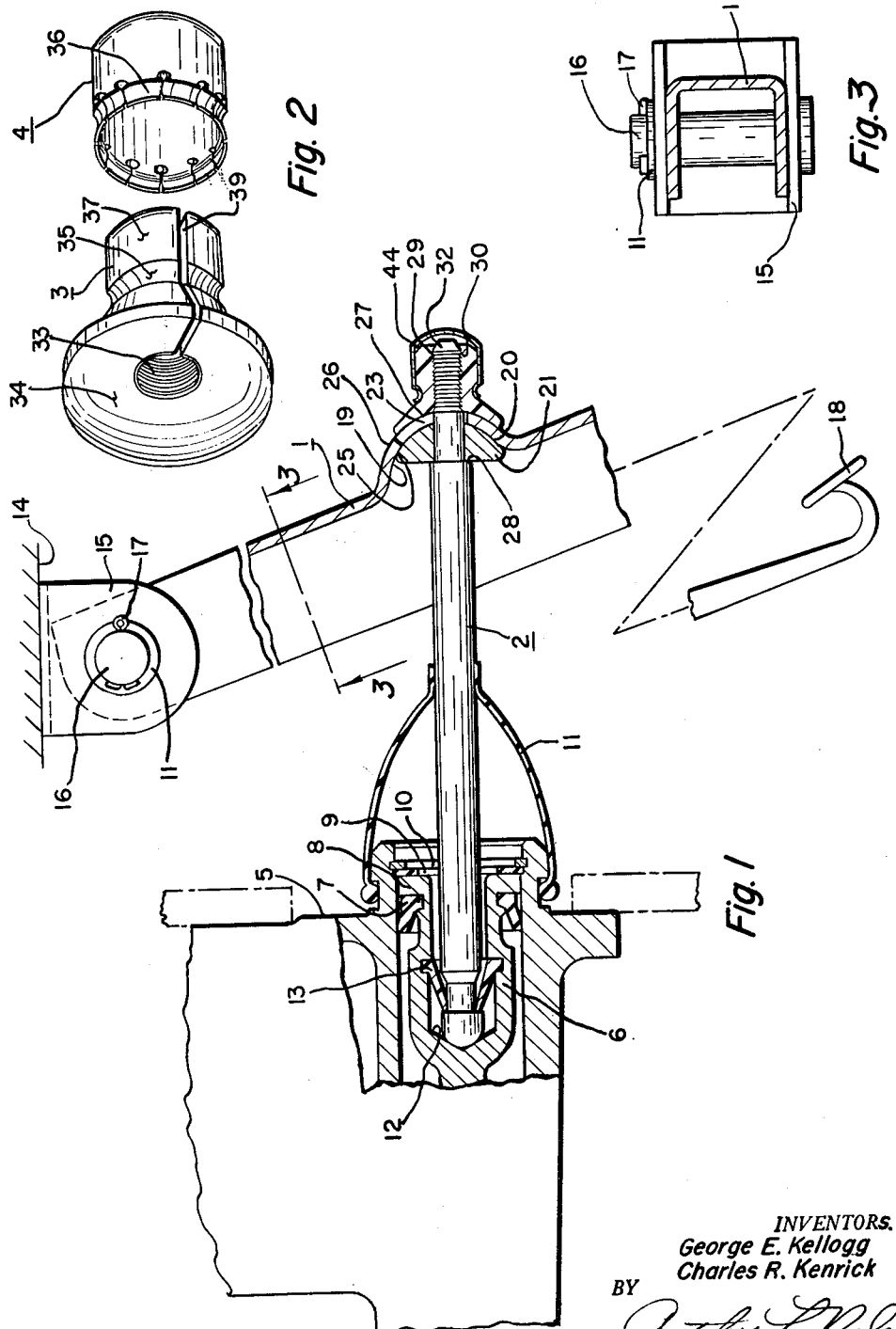

3,052,130
PEDAL CONNECTOR
George E. Kellogg, Miamisburg, and Charles R. Kenrick, Bellbrook, Ohio, assignors to General Motors Corporation, Detroit, Mich., a corporation of Delaware
Filed Nov. 25, 1959, Ser. No. 855,307
1 Claim. (Cl. 74—105)

This invention relates to a vehicle brake and more particularly to a connector for a brake pedal and push rod.

The conventional brake pedal and push rod are fastened by means of a clevis. This means of fastening requires considerable effort for the workman assembling the brake pedal and the push rod. This is also true in case of the repair man in assembling and disassembling of the brake pedal and push rod. The operation places the workman in an awkward position with limited room to assemble the pedal and the push rod.

Accordingly, this invention is intended to provide a convenient means for connecting the brake pedal and the push rod and which also requires less room to accomplish the operation.

It is an object of this invention to provide a fastening and pivoting means for a brake lever and a push rod.

It is another object of this invention to provide a brake lever and push rod with a ball joint permitting relative pivoting movement of these two elements. A radially expandable element is used for reception of the push rod with means for controlling the expansion of the element in providing a fastening means.

It is a further object of this invention to provide a ball and socket connector between a brake pedal and a push rod with an expandable sleeve received on the push rod and a cap for controlling the radial expansion of the sleeve to provide a fastening means between the pedal and the push rod.

It is a further object of this invention to provide a ball and socket joint between a brake pedal and a push rod wherein the push rod has a corrugated portion for receiving a radially expandable sleeve having a mating portion. A cap is mounted on the outer portion of the sleeve to control the radial expansion of the sleeve and form a fastening means.

The objects of this invention are provided by means of a pendant type brake pedal having a depression forming a spherical surface. The push rod for the master cylinder extends through an opening in the semi-spherical depression of the pedal. A mating seat is placed on the push rod to form a ball and socket joint. The push rod is fastened to the pedal by means of a radially expandable sleeve having a corrugated inner periphery. The outer periphery of the push rod is seated within the sleeve and has a mating corrugated portion. A cap is then placed on the outer periphery of the sleeve to control the radial expansion of the sleeve and thereby provide a fastening means between the brake pedal and the push rod.

Further objects and advantages of the present invention will be apparent from the following description, reference being had to the accompanying drawing wherein a preferred embodiment of the present invention is clearly shown.

In the drawing:

FIGURE 1 is a cross-section view of the pendant type brake pedal and the push rod extending through the pedal with its fastening means.

FIGURE 2 is a three-dimensional view of the expandable sleeve and the cap received on the expandable sleeve for controlling expansion.

FIGURE 3 is a cross-section view taken on line 3—3 of FIGURE 1.

FIGURE 1 illustrates the pendant type brake pedal operating a push rod extending into the master piston operating within the master cylinder. The brake pedal 1 and the push rod 2 are connected by a ball and socket joint. The joint is shown in cross-section in FIGURE 1. A three-dimensional view is shown in FIGURE 2 more specifically showing the structural details of the expandable sleeve 3 and the cap 4.

The master cylinder 5 is a conventional type and is adapted for mounting on the fire wall of the motor vehicle. The master cylinder 5 receives a master piston 6 for movement axially within the master cylinder. The master piston is provided with a rear seal 7 and a seating flange 8 resting against a washer 9. The washer 9 is seated between the flange 8 of the master piston 6 and the snap ring 10.

The push rod 2 and the master cylinder 5 are sealed by means of the flexible boot 11. The forward end of the push rod 2 extends into an opening extending on the rearward end of the piston 6. The push rod extends forwardly to engage a cone shaped surface 12. The push rod 2 is maintained in this position by the retainer ring 13.

The brake pedal 1 is pivotally mounted to the chassis 14 through the supporting lugs 15. The upper end of the brake pedal 1 and the lugs 15 are provided with an opening for the reception of a pin 16 which extends through the pedal and the lugs 15. The pin 16 receives the washer 11 which is retained in its position by the cotter pin 17. This manner of support provides a pivoting means for the pendant type pedal 1.

The brake pedal 1 is provided with a foot pad 18 on its lower end for operation of the brake pedal through manual means. The intermediate portion of the brake pedal 1 is formed with a recess 25 having a spherical surface 19. The spherical surface 19 abuts the mating spherical surface 20 of the seat 21. The recess 25 is formed with a vertical slot 23 for the reception of the end of the push rod 2. The vertical slot 23 permits the forward movement of the lower end of the pedal 1 during actuation of the vehicle brakes.

In forming the recess 25 on the forward side of the brake pedal 1 a protrusion or raised portion 26 is likewise formed on the back side of the brake pedal 1. This protrusion 26 forms the semi-spherical surface 27 extending from the longitudinal planar surface of the back side of the brake pedal 1.

The seat 21 seats on the shoulder 28 of the push rod 2. In this manner the seat bears against the shoulder providing a seating means for the pedal 1. The push rod 2 extends rearwardly from the shoulder 28 and is provided with a corrugated portion 29. The corrugated portion 29 is formed with annular ridges and grooves alternately spaced on the outer periphery of the push rod. The forward side of the ridges 30 are provided with a planar surface parallel to a plane perpendicular to the axis of the push rod 2. The rearward side of the ridges are inclined to a plane perpendicular to the axis of the push rod. In this manner the sleeve 3 is easily pushed forward on the push rod but resists rearward movement as the mating grooves and ridges of the sleeve 3 seat within the corrugations on the push rod 2.

The corrugations on the rear end of the push rod 2 may be of any cross section which does not resist the forward movement of the sleeve 3 in assembling of the push rod with the brake pedal. The specific configuration as shown in FIGURE 2 provides this advantage. A screw thread may also be employed in place of the corrugations, however, a screw thread has the disadvantage of permitting unscrewing of the sleeve 3 once the unit is assembled. The corrugations as shown do not permit disassembly through vibrations on the brake pedal or the push rod. Ridges 29 of sufficient sharpness will even eliminate need for mating grooves 33.

The rear end of the push rod is provided with a cone-shaped section 32 which assists in centering the push rod 2 as the end is inserted within the opening 33 of sleeve 3.

The sleeve 3 has a spherical surface 34 on its forward end adapted for engaging the mating surface 26 on the rearward side of the brake pedal 1. The spherical surfaces 34 and 26 provide full contact between the brake pedal and the sleeve 3.

The intermediate portion of the sleeve 3 is provided with an annular recess 35 adapted for receiving the resilient fingers 36 of the cap 4. The rearward end 37 of the sleeve 3 is provided with a cylindrical surface. The rearward end of the cap 4 is also formed in a similar shape for enclosing the portion 37 of the sleeve 3.

The sleeve 3 is slit along one side for the full length of the sleeve. The slit 39 provides a means for radially expanding the sleeve 3. A cap 4 upon placing over the surface 37 of the sleeve 3 prevents radial expansion of this portion of the sleeve and thereby provides a fastening means of the sleeve on the push rod 2.

This device operates in the following described manner. The master cylinder 5 is mounted on the forward side of the fire wall with the push rod 2 extending through the fire wall. The master cylinder is bolted onto the fire wall by a conventional means. The push rod extends through the fire wall into the passenger compartment where it is assembled with the brake pedal 1. The brake pedal 1 is suspended on the lugs 15 by means of inserting the pin 16 placing the washer on the pin and then inserting the key 17 for fastening the pedal. This provides a mounting means for the brake pedal so that the pedal pivots in a single plane. The pin 16 prevents any rotation of the pedal other than about the axis of the pin 16. The pedal 1 is of the pendant type and extends downwardly from the pivoting axis of pin 16.

The brake pedal 1 is pivoted rearwardly to permit the placement of the seat 21 on the push rod 2. The seat 21 abuts the shoulder 28 as it is assembled. The rearward end of the push rod 2 is then positioned in the slot 23. The pedal 1 is pushed forward until the seat 21 abuts the shoulder 28 as well as the surface 19 within the recess 25. In this position the sleeve 4 is received on the rearward end of the push rod 2. The cone shaped section 32 is inserted within the hole 33 and the sleeve is forced forwardly spreading the sleeve radially until it seats the surface 34 of the sleeve on the surface 27 of the pedal 1. The corrugations on the rear end of the push rod 2 are seated within the grooves of the sleeve 3 to prevent rearward movement of the sleeve. The cap 4 is then placed on the rearward end of the sleeve 3. The chamfer 40 on the rearward end of the sleeve 3 receives the fingers 36 on the cap 4. The cap is then driven forwardly until the fingers seat within the annular recess 35. In this position the brake pedal, the push rod, and the seat are permanently fastened in their positions. The sleeve 3 cannot move rearwardly because the cap 4 prevents any radial expansion of the sleeve so long as the cap is in position on the outer periphery of the sleeve.

This provides a convenient means for assembling the push rod with the brake pedal. It provides a pivoting surface for the brake pedal relative to the push rod. This device provides a convenient means for assembling these two elements as well as a savings in material in the manufacture of this type of pedal connection.

While the embodiment of the present invention as herein disclosed, constitutes a preferred form, it is to be understood that other forms might be adopted.

What is claimed is as follows:

A pivoting connector for a push rod and a brake pedal comprising in combination, a push rod having a shouldered portion thereby forming a smaller diameter on the end of said push rod, a corrugated portion on the smaller diameter portion of said push rod, a recess in said brake pedal forming a hemispherical surface within the said recess and a raised hemispherical surface on the opposite side of said pedal, a seat member engaging said shouldered portion, a hemispherical surface on said seat member received within the said recess of said brake pedal, a radially expandable sleeve having a hemispherical surface mating the raised spherical surface on said brake pedal, a longitudinal slot in said sleeve to permit radial expansion of said sleeve, a corrugated inner periphery in said sleeve receiving the corrugated portion on said end of said push rod, an end cap having resilient fingers, an annular recess on the outer periphery of said radially expandable sleeve receiving said resilient fingers of said end cap thereby maintaining said end cap on the radially outer periphery of said sleeve to prevent radial expansion of said sleeve in providing a pivoting means of said push rod with said brake pedal.

References Cited in the file of this patent

UNITED STATES PATENTS

| 1,476,491 | Coles | Dec. 4, 1923 |
| 1,844,463 | Dodd | Feb. 9, 1932 |
| 1,920,141 | Fischer | July 25, 1933 |
| 2,061,811 | Sinko | Nov. 24, 1936 |
| 2,350,685 | Kasdan | June 6, 1944 |
| 2,421,866 | Benzel | June 10, 1947 |
| 2,789,458 | Skeisvoll | Apr. 23, 1957 |
| 2,823,557 | Lenning | Feb. 18, 1958 |
| 2,882,066 | Petrak | Apr. 14, 1959 |
| 2,882,744 | Keller | Apr. 21, 1959 |
| 2,886,341 | MacPherson | May 12, 1959 |
| 2,927,802 | Huntington | Mar. 8, 1960 |

FOREIGN PATENTS

| 127,912 | Germany | Feb. 7, 1902 |